United States Patent
Foyer et al.

(10) Patent No.: US 10,364,313 B2
(45) Date of Patent: *Jul. 30, 2019

(54) METHOD FOR PRODUCING AN ABLATIVE RESIN

(71) Applicants: ARIANEGROUP SAS, Paris (FR); CENTRE NATIONAL DE LA RECHERCHE SCIENTIFIQUE, Paris (FR)

(72) Inventors: Gabriel M. Foyer, Montpellier (FR); Claire F. Negrell-Guirao, Lansargues (FR); Sylvain Y. Caillol, Montpellier (FR); Ghislain C. David, Montpellier (FR); Nadia Rodriguez, Bordeaux (FR)

(73) Assignees: ARIANEGROUP SAS, Paris (FR); CENTRE NATIONAL DE LA RECHERCHE SCIENTIFIQUE, Paris (FR)

(*) Notice: Subject to any disclaimer, the term of this patent is extended or adjusted under 35 U.S.C. 154(b) by 0 days.

This patent is subject to a terminal disclaimer.

(21) Appl. No.: 15/545,494

(22) PCT Filed: Jan. 20, 2016

(86) PCT No.: PCT/FR2016/050104
§ 371 (c)(1),
(2) Date: Jul. 21, 2017

(87) PCT Pub. No.: WO2016/116697
PCT Pub. Date: Jul. 28, 2016

(65) Prior Publication Data
US 2018/0022853 A1    Jan. 25, 2018

(30) Foreign Application Priority Data

Jan. 22, 2015 (FR) ...................................... 15 00127

(51) Int. Cl.
| C08G 8/04 | (2006.01) |
| C08J 3/24 | (2006.01) |
| B64D 33/04 | (2006.01) |

(52) U.S. Cl.
CPC ............... C08G 8/04 (2013.01); B64D 33/04 (2013.01); C08J 3/247 (2013.01); C08J 2361/08 (2013.01)

(58) Field of Classification Search
CPC ......... C08G 8/04; C08J 2361/08; C08J 3/247; B64D 33/04
See application file for complete search history.

(56) References Cited

U.S. PATENT DOCUMENTS

| 2,621,165 A | 12/1952 | Brown |
| 3,963,651 A | 6/1976 | Nickel |

(Continued)

FOREIGN PATENT DOCUMENTS

| EP | 0 274 075 A2 | 7/1988 |
| FR | 673 379 A | 1/1930 |

(Continued)

OTHER PUBLICATIONS

International Search Report as issued in International Patent Application No. PCT/FR2016/050104, dated Apr. 11, 2016.

(Continued)

*Primary Examiner* — Shane Fang
(74) *Attorney, Agent, or Firm* — Pillsbury Winthrop Shaw Pittman LLP

(57) ABSTRACT

A method for producing a propulsion nozzle, wherein the nozzle is produced from an ablative resin, the method including a step of pre-polymerization wherein an innovative aldehyde compound is used.

9 Claims, 1 Drawing Sheet

(56) References Cited

U.S. PATENT DOCUMENTS

| | | | |
|---|---|---|---|
| 3,981,929 | A | 9/1976 | David |
| 4,061,620 | A | 12/1977 | Gillern |
| 4,148,777 | A | 4/1979 | Labar |
| 4,259,464 | A | 3/1981 | Buriks |
| 4,296,219 | A | 10/1981 | Takahashi |
| 4,345,054 | A | 8/1982 | Takeda |
| 4,433,120 | A | 2/1984 | Chiu |
| 4,477,025 | A * | 10/1984 | Calabro ............... F02K 9/84 239/265.35 |
| 4,684,449 | A | 8/1987 | Takenaka et al. |
| 4,994,505 | A | 2/1991 | Gerber |
| 5,096,519 | A | 3/1992 | Kawakubo |
| 5,202,403 | A | 4/1993 | Doering |
| 5,238,776 | A | 8/1993 | Zampini |
| 5,663,246 | A | 9/1997 | Spaltenstein |
| 6,261,692 | B1 | 7/2001 | Park |
| 6,646,094 | B1 | 11/2003 | Malhotra |
| 2004/0039085 | A1 | 2/2004 | Kasowshi |
| 2008/0128938 | A1 | 6/2008 | Boutefeu |
| 2008/0275186 | A1 | 11/2008 | Banach |
| 2010/0316555 | A1 | 12/2010 | Kurakane et al. |
| 2011/0269902 | A1 | 11/2011 | Strunk |
| 2012/0277396 | A1 | 11/2012 | Caillol |
| 2014/0322479 | A1 | 10/2014 | Plaindoux |
| 2015/0369175 | A1 | 12/2015 | Berdoyes |

FOREIGN PATENT DOCUMENTS

| | | | |
|---|---|---|---|
| FR | 2 432 010 | A1 | 2/1980 |
| FR | 2 760 760 | A1 | 9/1998 |
| GB | 707 598 | A | 4/1954 |
| GB | 1 539 733 | A | 1/1979 |
| JP | H07-258364 | A | 10/1995 |
| JP | 10-130189 | * | 10/1996 ........... C07C 43/295 |

OTHER PUBLICATIONS

Katsoulidis, A. P. et al., "Phloroglucinol Based Microporous Polymeric Organic Frameworks with –OH Functional Groups and High CO2 Capture Capacity," Chemistry of Materials, vol. 23, No. 7, Apr. 2011, XP002755764, Retrieved from the Internet: URL: http://pubs.acs.org/doi/pdf/10.1021/cm103206x [retrieved on Mar. 22, 2016], pp. 1818-1824.

Park, J. K. et al., "Thermal and ablative properties of low temperature carbon fiber-phenol formaldehyde resin composites," Carbon, Elsevier, vol. 40, No. 12, Jan. 2002, XP004379499, pp. 2125-2134.

Foyer, G., et al., "New method for the synthesis of formaldehyde-free phenolic resins from lignin-based aldehyde precursors," European Polymer Journal, vol. 74, Nov. 2015, XP029350113, pp. 296-309.

Brown, L. H., "Resin Forming Reactions of Furfural and Phenol," J. Ind. Eng. Chem., vol. 44, (1952), pp. 2673-2675.

Ramires, E. C., et al., "Biobased composites from glyoxal-phenolic resins and sisal fibers," Bioresource Technology, vol. 101, (2010), pp. 1998-2006.

Hocking, M.B., "Vanillin: Synthetic Flavoring from Spent Sulfite Liquor," J. Chem. Educ., vol. 74, No. 9, Sep. 1997, pp. 1055-1059.

Notice of Allowance as issued in U.S. Appl. No. 15/545,457, dated Nov. 15, 2018.

International Search Report as issued in International Patent Application No. PCT/FR2016/050106, dated Apr. 7, 2016.

International Preliminary Report on Patentability and the Written Opinion of the International Searching Authority as issued in International Patent Application No. PCT/FR2016/050106, dated Jul. 25, 2017.

"Reduction of the aldehyde functional group of vanillin: CAPLP [French certificate for teaching in vocational high schools] competitive examination maths sciences 2012," Mar. 2012, XP055205878, retrieved from the Internet: URL:http://www.chimix.com/an12/cap12/caplp5.html.

Kumar, V., et al., "Enzyme Mediated Oxidative Polymerization of 4-Hydroxybenzyl Alcohol for Optical Applications," Journal of Macromolecular Science, Part A: Pure and Applied Chemistry, vol. 39, No. 10, Jan. 2002, XP055205868, pp. 1183-1193.

Kobayashi, A., et al., "Rapid Synthesis of Phenolic Resins by Microwave-Assisted Self-Condensation of Hydroxybenzyl Alcohol Derivatives," Polymer Journal, vol. 40, No. 7, Jun. 2008, XP055205889, pp. 590-591.

Ren, S., et al., "Zeolites as Shape-Selective Catalysts: Highly Selective Synthesis of Vanillin from Reimer-Tiemann Reaction of Guaiacol and Chloroform," Catal. Lett. vol. 145, (2015), pp. 712-714.

Lidnsey et al. (Lidnsey et al., The Kolbe Schmitt Reaction, Chemical Reviews, 1957, p. 583-620) (Year: 1957).

Eapen et al. (Die Makromolekulare Chemie 119, 1968, 4-16) (Year: 1968).

* cited by examiner

METHOD FOR PRODUCING AN ABLATIVE RESIN

CROSS REFERENCE TO RELATED APPLICATIONS

This application is the U.S. National Stage of PCT/FR2016/050104 filed Jan. 20, 2016, which in turn claims priority to French Application No. 1500127, filed Jan. 22, 2015. The contents of both applications are incorporated herein by reference in their entirety.

BACKGROUND OF THE INVENTION

The invention relates to a novel method for producing a phenolic resin.

It is known practice to make propulsion nozzles using phenolic resins of resol type, for example using an ablative resin such as the Ablaphene RS101 resin. The phenolic resins used for this application must have excellent heat stability and carbonizing properties.

The phenolic resins such as the Ablaphene RS101 resin are synthesized from formaldehyde and phenol. It is known that formaldehyde is very reactive with respect to phenol. The phenolic resins synthesized from these two compounds have high aromatic densities and high crosslinking densities, which give the resins the desired heat stability and carbonizing properties.

However, formaldehyde and phenol are compounds categorized as category 1B and 2 carcinogenic, mutagenic, reprotoxic (CMR), respectively.

Because of its toxicity, formaldehyde is a chemical compound the use of which is becoming strictly regulated by CMR legislation. Furthermore, formaldehyde is a chemical compound derived from exhaustable fossil resources.

Several studies on the synthesis of phenolic resins from aldehyde compounds derived from renewable resources and without formaldehyde have been carried out. The formaldehyde is then replaced with aldehyde compounds such as glyoxal [E. C. Ramires, J. D. Megiatto, C. Gardrat, A. Castellan, E. Frollini, Biobased composites from glyoxal-phenolic resins and sisal fibers, Bioresour. Technol., 101 (2010) 1998-2006] or furfural [L. H. Brown, Resin-forming reactions of furfural and phenol, J. Ind. Eng. Chem., 44 (1952) 2673-2675] for example. These compounds are less reactive than formaldehyde and can result in the obtaining of phenolic resins which have heat stability and carbonizing properties that are insufficient for producing aeronautical parts such as propulsion nozzles. Furthermore, these compounds, although they are less toxic than formaldehyde, are nevertheless categorized as CMR 2.

There is thus a need to have a novel route of synthesis of phenolic resins which makes it possible to dispense with the use of formaldehyde or other aldehyde compounds categorized as CMR.

There is also a need to have a novel route of synthesis of phenolic resins which have heat stability and carbonizing properties that are suitable for producing aeronautical parts such as propulsion nozzles.

SUBJECT AND SUMMARY OF THE INVENTION

To this effect, the invention provides, according to a first aspect, a method for producing a phenolic resin comprising the following step:

a) pre-polymerization of an aromatic aldehyde compound with a phenolic compound in order to obtain the phenolic resin, the aromatic aldehyde compound having one or other of the following formulae A and B:

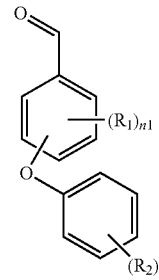

A

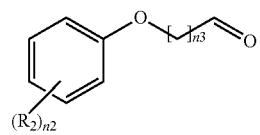

B in which formulae $n_1$ is an integer between 0 and 4 and when $n_1$ is greater than or equal to 2, the substituents $R_1$ are identical or different, $n_2$ is an integer between 0 and 5, for example between 1 and 5, and when $n_2$ is greater than or equal to 2, the substituents $R_2$ are identical or different and $n_3$ is an integer between 1 and 6, and in which the substituents $R_1$ and $R_2$ are chosen independently from one another from: —OH, —COOH, —CHO, the groups —O-Alk wherein Alk denotes a substituted or unsubstituted alkyl chain of 1 to 4 carbon atoms, saturated or unsaturated, substituted or unsubstituted hydrocarbon-based chains comprising between 1 and 20 carbon atoms, optionally interrupted with one or more heteroatoms, and optionally having one or more carbonyl or carboxylic acid functions, substituted or unsubstituted, monocyclic or polycyclic, saturated, unsaturated or aromatic carbocyclic or heterocyclic groups optionally having one or more carbonyl or carboxylic acid functions, and substituted or unsubstituted aryl groups optionally having one or more carbonyl or carboxylic acid functions, $R_2$ possibly also denoting a radical of formula A1 in formula A above or a radical of formula B1 in formula B above and $R_1$ possibly also denoting a radical of formula A2 in formula A above, formulae A1, A2 and B1 being the following:

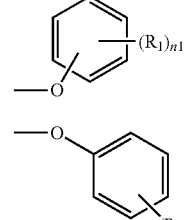

A1

A2

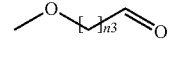

B1 in formulae A1, A2 and B1, $R_1$, $R_2$, $n_1$, $n_2$ and $n_3$ are as defined above.

The term "phenolic compound" should be understood to mean an organic molecule comprising at least one benzene nucleus to which is attached at least one hydroxyl (—OH) group.

During the pre-polymerization step, there is addition of the phenolic compound onto the aromatic aldehyde compound in order to form addition products which will undergo condensation in order to obtain the phenolic resin. Step a) results in a phenolic resin which constitutes a pre-polymer insofar as it has reactive groups enabling it to participate in a subsequent crosslinking reaction.

The invention advantageously makes it possible to dispense with the use of formaldehyde for the production of phenolic resins by providing a novel method for obtaining phenolic resins from innovative aromatic aldehyde compounds for this application.

As will be explained in detail below, the aromatic aldehyde compound used during step a) can advantageously have a low toxicity and be produced from renewable resources.

As mentioned above, it is possible to crosslink together various phenolic resins obtained by carrying out step a) in order to obtain a product having a high molecular weight. Thus, the invention is also directed toward a method for producing a crosslinked phenolic resin, comprising a step b) during which a heat treatment is carried out so as to crosslink phenolic resins obtained by carrying out a process as described above, in order to obtain the crosslinked phenolic resin.

Advantageously, the aromatic aldehyde compound used during step a) can be polyfunctional and, for example, can be an aromatic polyaldehyde compound (i.e. an aromatic aldehyde compound having several aldehyde functions). The polyfunctional and aromatic nature of such an aromatic aldehyde compound advantageously makes it possible to obtain, after the crosslinking step b), a resin which has a high crosslinking density and also a high aromatic density. Thus, the use of such an aromatic aldehyde compound advantageously makes it possible to obtain, after step b), a crosslinked phenolic resin the applicative properties and the heat stability and carbonizing properties of which are similar to, or even better than, those of the Ablaphene RS101 resin.

In the case where $R_2$ denotes a radical of formula A1 in formula A above, it should be understood that compound A has the following formula:

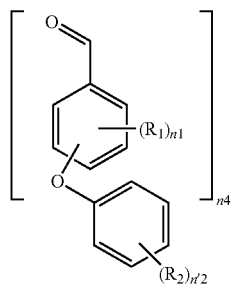

wherein $n_4$ is an integer between 2 and 6 and $n'_2$ is an integer between 0 and $6-n_4$ with $n'_2=n_2-(n_4-1)$ and with $R_1$, $R_2$ and $n_1$ as defined above. It will be advantageous to use such an aromatic polyaldehyde compound during step a) since it will make it possible to obtain phenolic resins with high degrees of crosslinking and high aromatic densities after step b). This will give the resins formed excellent heat stability and carbonizing properties. Furthermore, because of its higher molar mass, such an aromatic polyaldehyde compound will exhibit a volatility and a toxicity that are greatly reduced compared with formaldehyde.

In the case where $R_2$ denotes a radical of formula B1 in formula B above, it should be understood that compound B has the following formula:

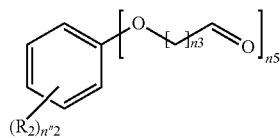

wherein $n_5$ is an integer between 2 and 6 and $n''_2$ is an integer between 0 and $6-n_5$ with $n''_2=n_2-(n_5-1)$ and with $R_2$ and $n_3$ as defined above. It will be advantageous to use such an aromatic polyaldehyde compound during step a) since it will make it possible to obtain phenolic resins with high crosslinking densities and high aromatic densities after step b). This will give the resins formed excellent heat stability and carbonizing properties. Furthermore, because of its higher molecular weight, such an aromatic polyaldehyde compound will exhibit a volatility and a toxicity that are greatly reduced compared with formaldehyde.

In the case where $R_1$ denotes a radical of formula A2 in formula A above, it should be understood that compound A has the following formula:

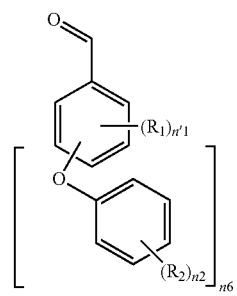

wherein $n_6$ is an integer between 2 and 5 and is an integer between 0 and $5-n_6$ with $n'_1=n_1-(n_6-1)$ and with $R_1$, $R_2$ and $n_2$ as defined above.

In one implementation example, the aromatic aldehyde compound used during step a) can have the formula A and the method can, in addition, comprise, before step a), a step of producing said aromatic aldehyde compound by aromatic nucleophilic substitution reaction between a compound having the formula A3 and a compound having the formula A4 wherein X denotes a leaving group, the formulae A3 and A4 being the following:

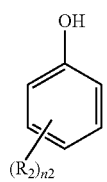

A3

-continued

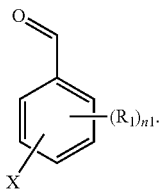
A4

In the formulae A3 and A4, $R_1$, $R_2$, $n_1$ and $n_2$ are as defined above.

The leaving group X can for example be a halogen atom or a nitro group —$NO_2$, the leaving group preferably being a halogen atom.

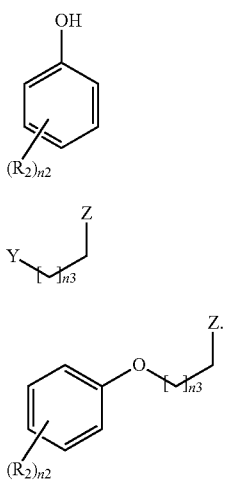

As a variant, the aromatic aldehyde compound used during step a) can have the formula B and the method can, in addition, comprise, before step a), the following two steps:

1) a nucleophilic substitution reaction between a compound of formula A3 and a compound of formula B2 in order to obtain a compound of formula B3, wherein Z is a protective group making it possible to obtain an aldehyde function after deprotection and Y is a leaving group, and 2) a reaction for deprotection of the compound of formula B3 in order to obtain the aromatic aldehyde compound of formula B, the formulae A3, B2, B3 being the following:

In the formulae A3, B2 and B3, $R_2$, $n_2$ and $n_3$ are as defined above. The leaving group Y can for example be a halogen atom.

The group Z can for example be an acetal group; in this case, the compound B3 has the following formula:

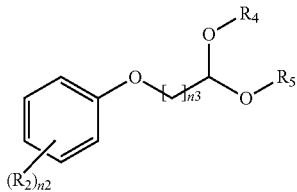

wherein $R_4$ and $R_5$ are $C_1$ to $C_8$ hydrocarbon-based chains optionally forming a ring. As a variant, the group Z can be an imine function.

Preferably, the substituents $R_1$ and $R_2$ can be chosen independently from one another from: —OH, —CHO, the groups —O-Alk wherein Alk denotes a substituted or unsubstituted alkyl chain of 1 to 4 carbon atoms, preferably —OMe, —COOH, and substituted or unsubstituted aryl groups optionally having one or more carbonyl or carboxylic acid functions, $R_2$ possibly also denoting a radical of formula A1 in formula A above or a radical of formula B1 in formula B above and $R_1$ possibly also denoting a radical of formula A2 in formula A above; in formulae A1, A2 and B1, $R_1$ and $R_2$ are as defined above in this paragraph. In the formulae A1, A2 and B1, $n_1$, $n_2$ and $n_3$ are as defined above.

Preferably still, the substituents $R_1$ and $R_2$ are chosen independently from one another from: —OH, —CHO, —OMe wherein Me denotes a methyl group, and substituted or unsubstituted aryl groups optionally having one or more carbonyl or carboxylic acid functions.

Preferably, $n_1$ can be between 0 and 2 and $n_2$ can be between 0 and 3 for formula A. In this implementation example, $n_1$ can preferably be equal to 0.

Preferably, $n_2$ can be between 0 and 3 and $n_3$ can be between 1 and 3 for formula B.

Preferably, the compound of formula A3 used for producing the aromatic aldehyde compound can be chosen from: simple phenols, polyphenolic compounds, for example diphenolic compounds, hydroxybenzoic aldehydes, hydroxybenzoic acids, hydroxybenzyl alcohols, hydroxycinnamyl alcohols, hydroxycinnamic acids, phenylpropenes, coumarins, naphthoquinones, stilbenoids, flavonoids, isoflavonoids, anthocyans, lignans, lignins, condensed tannins, hydrolyzable tannins, depolymerized tannins, and resol and novolac resins.

Preferably still, the compound of formula A3 used for producing the aromatic aldehyde compound can be chosen from: simple phenols, polyphenolic compounds, for example diphenolic compounds, hydroxybenzoic aldehydes, hydroxybenzoic acids, hydroxybenzyl alcohols, and resol and novolac resins.

Particularly preferably, the compound of formula A3 used for producing the aromatic aldehyde compound can be chosen from: simple phenols, for example phenol, resorcinol or phloroglucinol, and hydroxybenzoic aldehydes, for example para-hydroxybenzaldehyde, vanillin or syringaldehyde.

For example, the compound of formula A3 used for producing the aromatic aldehyde compound can be chosen from: phenol, pyrocatechol, resorcinol, hydroquinone, phloroglucinol, pyrogallol, guaiacol, syringol, bis-phenol A, bis-phenol S, para-hydroxybenzaldehyde, vanillin, syringaldehyde, dehydrodivanillin, 2-hydroxybenzyl alcohol, 4-hydroxybenzyl alcohol, vanillyl alcohol, syringyl alcohol, para-coumaryl alcohol, coniferyl alcohol, sinapyl alcohol, ferulic acid, para-hydroxybenzoic acid, gallic acid, para-coumaric acid, eugenol, isoeugenol, cardanols, cardols, anacardic acids, catechin, umbelliferone, juglone, trans-resveratrol, kaempferol, daidzein, delphinidol, enterodiol, lignins, procyanidins, gallotannins, condensed tannins, and resol and novolac resins. For example, the compound of formula A3 used for producing the aromatic aldehyde compound can be chosen from: phenol, resorcinol, phloroglucinol, hydroquinone, 2-hydroxybenzyl alcohol, 4-hydroxybenzyl alcohol, vanillyl alcohol, syringyl alcohol, bis-phenol A, bis-phenol S, para-hydroxybenzaldehyde, vanillin, syringaldehyde, and resol and novolac resins.

Such examples of compounds A3 can be produced from renewable resources and can advantageously be used in the context of the invention.

In one implementation example, the phenolic compound can be chosen from: simple phenols, polyphenolic compounds, for example diphenolic compounds, and phenols and polyphenolic compounds which can optionally be substituted with alkoxyl groups for example.

The phenolic compound can, for example, be chosen from: phenol, pyrocatechol, resorcinol, hydroquinone, phloroglucinol, pyrogallol, guaiacol, syringol, bis-phenol A, bis-phenol S, para-hydroxybenzaldehyde, vanillin, syringaldehyde, dehydrodivanillin, 2-hydroxybenzyl alcohol, 4-hydroxybenzyl alcohol, vanillyl alcohol, syringyl alcohol, para-coumaryl alcohol, coniferyl alcohol, sinapyl alcohol, ferulic acid, para-hydroxybenzoic acid, gallic acid, para-coumaric acid, eugenol, isoeugenol, cardanols, cardols, anacardic acids, catechin, umbelliferone, juglone, trans-resveratrol, kaempferol, daidzein, delphinidol, enterodiol, lignins, procyanidins, gallotannins, condensed tannins, and resol and novolac resins. The phenolic compound can, for example, be chosen from: phenol, resorcinol, hydroquinone, phloroglucinol, 2-hydroxybenzyl alcohol, 4-hydroxybenzyl alcohol, vanillyl alcohol, syringyl alcohol, bis-phenol A, bis-phenol S, para-hydroxybenzaldehyde, vanillin, resol and novolac resins, procyanidins and condensed tannins.

Such examples of phenolic compounds can be produced from renewable resources and can advantageously be used in the context of the invention.

In one implementation example, an aromatic aldehyde compound of formula A5 or A6 can be used during step a), the formulae A5 and A6 being the following:

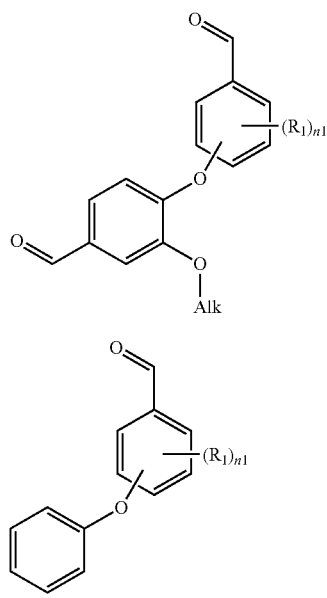

wherein $R_1$ and $n_1$ are as defined above and Alk denotes a substituted or unsubstituted alkyl chain of 1 to 4 carbon atoms.

In one implementation example, an aromatic aldehyde compound of formula B4 or B5 can be used during step a), the formulae B4 and B5 being the following:

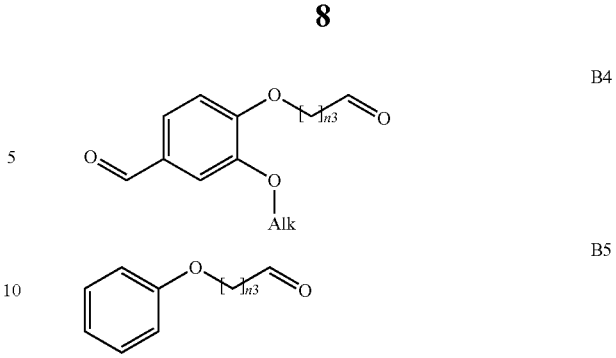

wherein $n_3$ is as defined above and Alk denotes a substituted or unsubstituted alkyl chain of 1 to 4 carbon atoms.

The invention is also directed toward a method for producing a propulsion nozzle, wherein the nozzle is produced from a phenolic resin obtained by carrying out a method as described above or from a crosslinked phenolic resin obtained by carrying out a method as described above.

The propulsion nozzle can be made of composite material. In this case, the production of the nozzle can comprise a first step of forming a fibrous pre-form of the nozzle to be obtained, impregnated with one or more pre-polymerized phenolic resins obtained as described above. This production can also comprise a second step of curing the impregnated fibrous pre-form so as to crosslink the pre-polymerized phenolic resin(s) and to obtain the propulsion nozzle.

The fibrous pre-form can for example comprise carbon fibers, silica fibers, glass fibers or fibers of a ceramic material, for example silicone carbide fibers. The fibrous preform intended to form the fibrous reinforcement of the nozzle can be formed in various ways (drape-forming of layers of fabric that have been pre-impregnated with the pre-polymerized phenolic resin(s) for example).

BRIEF DESCRIPTION OF THE DRAWINGS

Other characteristics and advantages of the invention will emerge from the following description with reference to the appended drawings, wherein.

EXAMPLES

Figure 1:
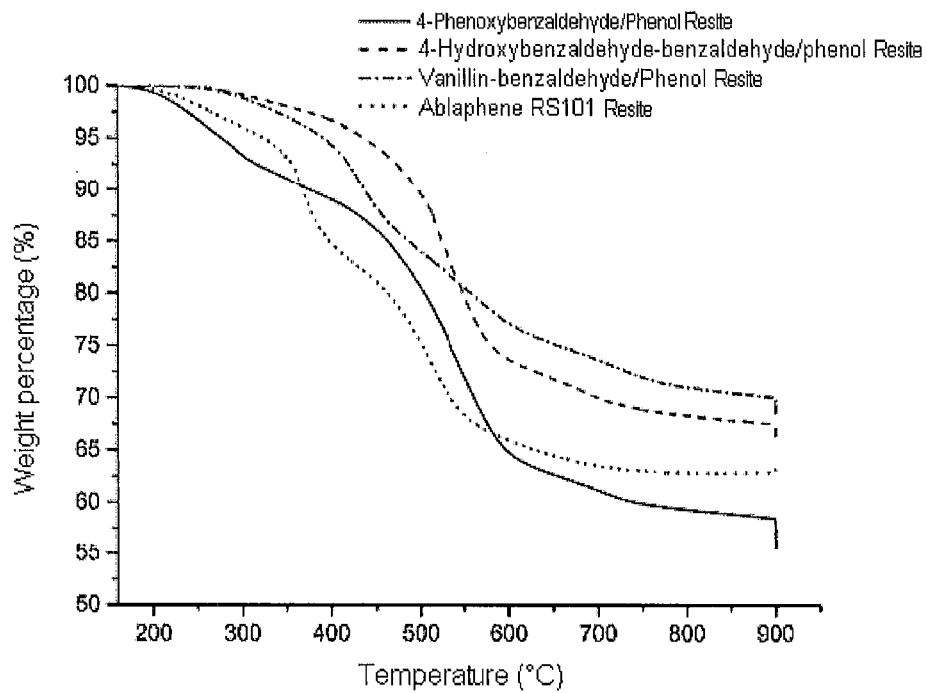
FIGS. 1 and 2 represent results of thermogravimetric analyses comparing the properties of resins obtained by means of a method according to the invention and of the Ablaphene RS 101 resin.

Example 1: Grafting of Aromatic Aldehyde Functions (Synthesis of 4-Phenoxybenzaldehyde and Application of the Latter in Synthesis of Phenolic Resin without Formaldehyde)

Phenol (5 g, 1 eq., 53 mmol), 4-fluorobenzaldehyde (5.4 g, 0.82 eq., 43.5 mmol), potassium carbonate (14.68 g, 2 eq., 106 mmol) and 50 ml of N,N-dimethylformamide are placed in a 100 ml round-bottomed flask equipped with a condenser, with magnetic stirring and under an argon atmosphere. The round-bottomed flask is immersed in a bath of oil thermostated at 110° C. for 15 hours. At the end of the 15 hours of reaction, the $^1$H NMR analysis of the reaction crude indicates that the conversion of the 4-fluorobenzaldehyde to 4-phenoxybenzaldehyde is total. The reaction medium is filtered through filter paper, and the filtrate is recovered and then distilled under reduced pressure in order to remove the DMF. The product is purified by liquid-liquid extraction with EtOAc/H₂O. The organic phases are recovered and washed three times with a concentrated sodium hydroxide solution at 1 mol/l. The purpose of these washes is to remove the residual phenol and the residual DMF. The organic phases are recovered, dried over anhydrous magnesium sulfate and concentrated under reduced pressure. 4.93 g of 4-phenoxybenzaldehyde product are recovered. The product analyzed by $^1$H and $^{13}$C NMR is pure. Appearance: colorless oil. Weight yield=57%.

This reaction is summarized by the synthesis scheme below.

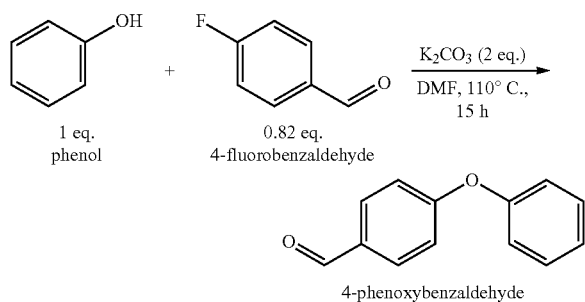

A phenolic resin was then synthesized without formaldehyde from 4-phenoxybenzaldehyde according to the operating protocol detailed below.

4-Phenoxybenzaldehyde (6.32 g, 1.5 eq., 31.9 mmol), phenol (2 g, 1 eq., 21.3 mmol) and sodium hydroxide in aqueous solution at 50% by weight (0.41 g, 0.5 eq., 10.3 mmol) are placed in a 50 ml round-bottomed flask equipped with a condenser, with magnetic stirring. The round-bottomed flask is immersed in a bath of oil thermostated at 130° C. for 20 minutes. At the end of this reaction, the mixture is in homogeneous and viscous resitol form. It is recovered, placed in an aluminum dish and baked in an oven, under atmospheric pressure, according to a baking program consisting of an increase in temperature from 40° C. to 180° C. at the rate of 3° C./h and of a stationary temperature phase of 24 h at 180° C. The resite material obtained at the end of this baking is black, rigid and totally insoluble in acetone.

These reactions are summarized by the synthesis scheme below.

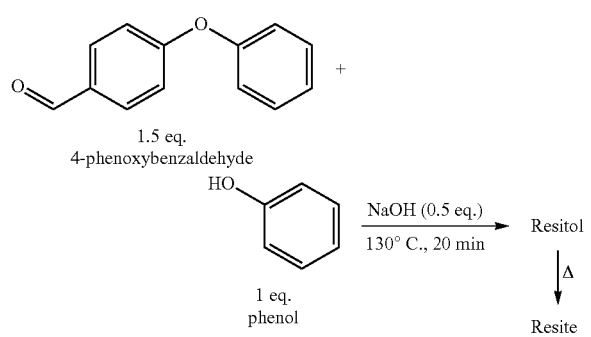

Example 2: Grafting of Aromatic Aldehyde Functions (Synthesis of 4-Hydroxybenzaldehyde-Benzaldehyde and Application of the Latter in Synthesis of Phenolic Resin without Formaldehyde)

4-Hydroxybenzaldehyde (20 g, 1 eq., 164 mmol), 4-fluorobenzaldehyde (41.7 g, 2 eq., 329 mmol), potassium carbonate (45.5 g, 2 eq., 329 mmol) and 155 ml of N,N-dimethylformamide are placed in a 500 ml round-bottomed flask equipped with a condenser, with magnetic stirring and under an argon atmosphere. The round-bottomed flask is immersed in a bath of oil thermostated at 110° C. for 6 hours. At the end of the 6 hours of reaction, the conversion of the 4-hydroxybenzaldehyde to 4-hydroxybenzaldehyde-benzaldehyde, determined by $^1$H NMR analyses of the reaction crude, is total. The reaction medium is filtered through filter paper, and the filtrate is recovered and then distilled under reduced pressure in order to remove the DMF. The product is purified by liquid-liquid extraction with EtOAc/H₂O and then washed three times with a brine solution in order to remove the residual DMF. The organic phases are recovered, dried over anhydrous magnesium sulfate and then concentrated under reduced pressure. The excess 4-fluorobenzaldehyde reagent is distilled off under vacuum (T=80° C., P=5×10⁻³ mbar). 35.4 g of 4-hydroxybenzaldehyde-benzaldehyde product are recovered. The $^1$H and $^{13}$C NMR analyses indicate that the product is pure. Appearance: white powder. Weight yield=95%.

This reaction is summarized by the synthesis scheme below.

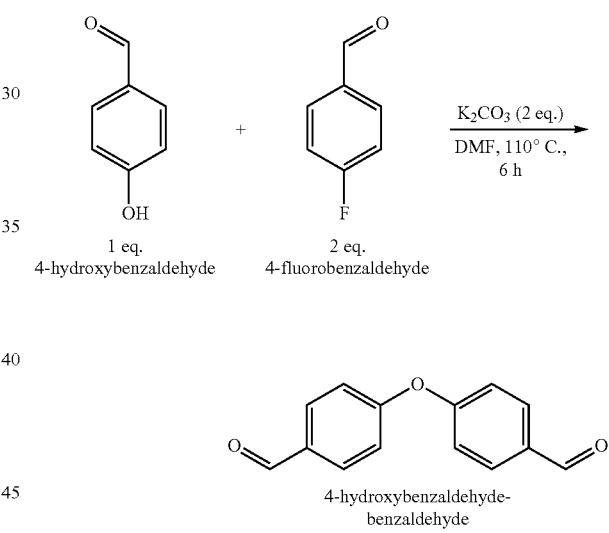

A phenolic resin was then synthesized without formaldehyde from 4-hydroxybenzaldehyde-benzaldehyde according to the operating protocol detailed below.

4-Hydroxybenzaldehyde-benzaldehyde (1.24 g, 035 eq., 5.5 mmol), phenol (0.686 g, 1 eq., 7.3 mmol) and sodium hydroxide in aqueous solution at 50% by weight (0.09 g, 0.3 eq., 2.2 mmol) are placed in a 50 ml round-bottomed flask equipped with a condenser, with magnetic stirring. The round-bottomed flask is immersed in a bath of oil thermostated at 130° C. for 15 minutes. At the end of this reaction, the mixture is in homogeneous and viscous resitol form. It is recovered, placed in an aluminum dish and baked in an oven, under atmospheric pressure, according to a baking program consisting of an increase in temperature from 40° C. to 180° C. at the rate of 3° C./h and of a stationary temperature phase of 24 h at 180° C. The resite material obtained at the end of this baking is black, rigid and totally insoluble in acetone.

These reactions are summarized by the synthesis scheme below.

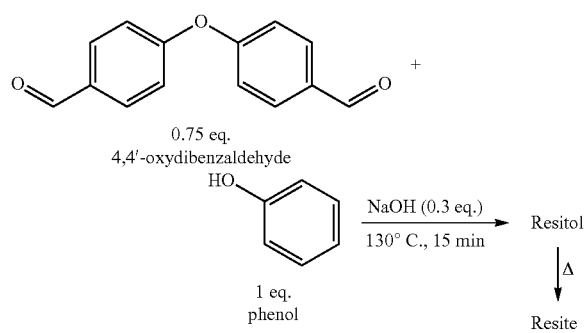

Example 3: Grafting of Aromatic Aldehyde Functions (Synthesis of Vanillin-Benzaldehyde and Application of the Latter in Synthesis of Phenolic Resin without Formaldehyde)

Vanillin (1.62 g, 1 eq., 10.6 mmol), 4-fluorobenzaldehyde (2.63 g, 2 eq., 21.2 mmol), potassium carbonate (2.94 g, 2 eq., 21.2 mmol) and 10 ml of N,N-dimethylformamide are placed in a 50 ml round-bottomed flask equipped with a condenser, with magnetic stirring and under an argon atmosphere. The round-bottomed flask is immersed in a bath of oil thermostated at 110° C. for 42 hours. The vanillin used can, for example, be obtained from a biobased synthesis route as described in the article: M. B. Hocking, Vanillin: synthetic flavoring from spent sulfite liquor, J. Chem. Educ., 74 (1997) 1055-1059. At the end of the 42 hours of reaction, the conversion of the vanillin to vanillin-benzaldehyde, determined by $^1$H NMR analysis of the reaction crude, is total. The reaction medium is filtered through filter paper, and the filtrate is recovered and then distilled under reduced pressure in order to remove the DMF. The product is purified by liquid-liquid extraction with EtOAc/H$_2$O and then washed three times with a brine solution in order to remove the residual DMF. The organic phases are recovered, dried over anhydrous magnesium sulfate and then concentrated under reduced pressure. The vanillin-benzaldehyde product is separated from the excess 4-fluorobenzaldehyde reagent by separative silica chromatography with the eluent: 90% cyclohexane/10% EtOAc. 2.04 g of product are recovered. The $^1$H and $^{13}$C NMR analyses indicate that the product is pure. Appearance: white powder. Weight yield=75%.

This reaction is summarized by the synthesis scheme below.

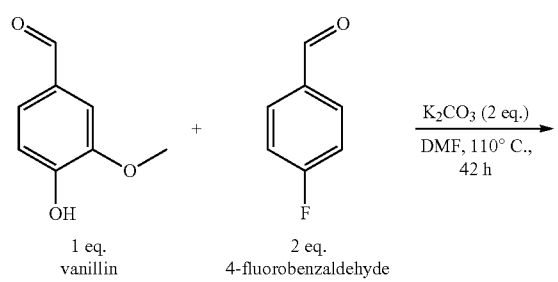

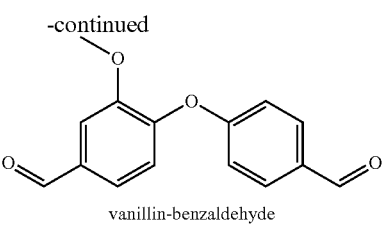

vanillin-benzaldehyde

A phenolic resin was then synthesized without formaldehyde from the vanillin-benzaldehyde according to the operating protocol detailed below.

Vanillin-benzaldehyde (1.4 g, 0.75 eq., 5.5 mmol), phenol (0.686 g, 1 eq., 7.3 mmol) and sodium hydroxide in aqueous solution at 50% by weight (0.1 g, 0.3 eq., 2.5 mmol) are placed in a 50 ml round-bottomed flask equipped with a condenser, with magnetic stirring. The round-bottomed flask is immersed in a bath of oil thermostated at 130° C. for 20 minutes. At the end of this reaction, the mixture is in homogeneous and viscous resitol form. It is recovered, placed in an aluminum dish and baked in an oven, under atmospheric pressure, according to a baking program consisting of an increase in temperature from 40° C. to 180° C. at the rate of 3° C./h and of a stationary temperature phase of 24 h at 180° C. The resite material obtained at the end of this baking is black, rigid and totally insoluble in acetone.

These reactions are summarized by the synthesis scheme below.

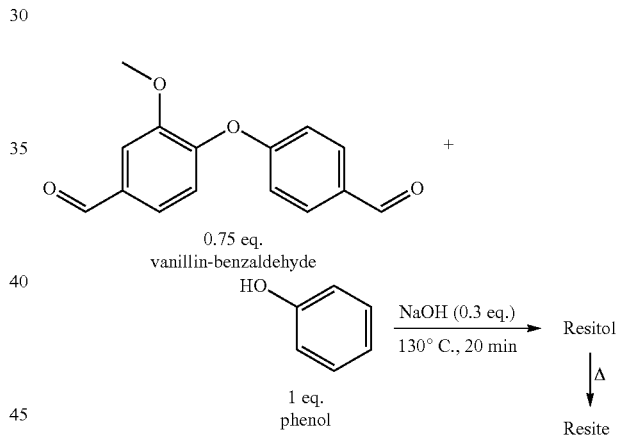

Example 4: Grafting of Aliphatic Aldehyde Functions for the Preparation of Phenolic Resins without Formaldehyde In this example, 2-(phenoxymethyl)-1,3-dioxolane was first of all synthesized according to the operating protocol described below.

Phenol (3 g, 1 eq., 31.9 mmol), potassium carbonate (8.81 g, 2 eq., 63.8 mmol), 2-bromomethyl-1,3-dioxolane (10.65 g, 2 eq., 46.1 mmol) and butyronitrile 30 ml) are placed in a 100 ml round-bottomed flask equipped with a condenser, with magnetic stirring. The medium is placed at reflux of the butyronitrile, at 115° C. After 58 hours of reaction, the conversion of the phenol to 2-(phenoxymethyl)-1,3-dioxolane, determined by $^1$H NMR analysis of the reaction crude, is total. The reaction medium is filtered through filter paper and the product is purified by liquid-liquid extraction with EtOAc/H$_2$O. The organic phases are recovered, dried over anhydrous magnesium sulfate and concentrated under reduced pressure. The residual dioxolane reagent present in the product is distilled off under secondary vacuum (T=100° C., P=2×10⁻² mbar). 4.12 g of 2-(phenoxymethyl)-1,3-dioxolane are obtained. The product characterized by ¹H and ¹³C NMR is pure. Appearance: colorless liquid. Weight yield=72%.

This reaction is summarized by the synthesis scheme below.

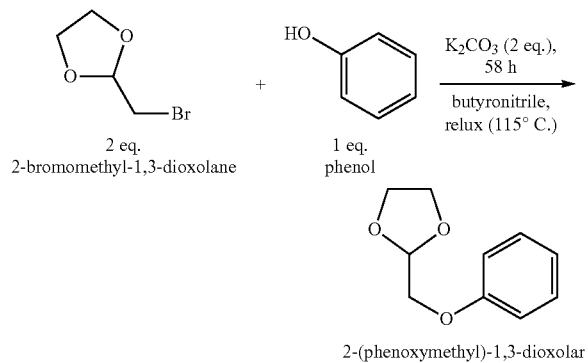

2 eq.
2-bromomethyl-1,3-dioxolane 1 eq.
phenol 2-(phenoxymethyl)-1,3-dioxolane

Starting from the 2-(phenoxymethyl)-1,3-dioxolane, 2-phenoxyacetaldehyde was then synthesized by carrying out the operating protocol described below.

The 2-(phenoxymethyl)-1,3-dioxolane compound (0.756 g, 1 eq., 4.2 mmol) and the mixture of solvents consisting of 32 ml of HCl solution at 1 mol/l (7.6 eq., 32 mmol) and of 32 ml of 1,4-dioxane are placed in a 250 ml round-bottomed flask with magnetic stirring and equipped with a condenser. The round-bottomed flask is placed in a bath of oil thermostated at 80° C. for 5 h. At the end of this reaction, the pH of the reaction medium is neutralized with a saturated NaHCO₃ solution, the dioxane solvent is evaporated off under reduced pressure and the product is purified by liquid-liquid extraction with EtOAc/H₂O. The organic phases are recovered, dried over anhydrous magnesium sulfate and concentrated under reduced pressure. The product is isolated pure by separative chromatography with a mixture of EtOAc/cyclohexane eluent: 20/80. 0.35 g of 2-phenoxyacetaldehyde product are obtained. The product characterized by ¹H and ¹³C NMR is pure. Appearance: colorless oil. Weight yield=62%.

This reaction for deprotection of the 2-(phenoxymethyl)-1,3-dioxolane to give 2-phenoxyacetaldehyde is summarized by the synthesis scheme below.

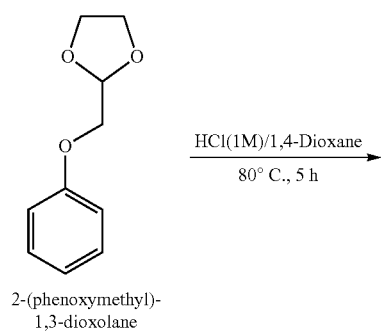

2-(phenoxymethyl)-
1,3-dioxolane

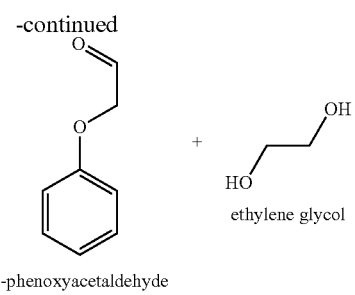

ethylene glycol 2-phenoxyacetaldehyde

A phenolic resin was then synthesized without formaldehyde from 2-phenoxyacetaldehyde according to the operating protocol detailed below.

2-Phenoxyacetaldehyde (2 g, 1.5 eq., 14.7 mmol), phenol (0.922 g, 1 eq., 9.8 mmol) and sodium hydroxide in aqueous solution at 50% by weight (0.15 g, 0.4 eq., 16 mmol) are placed in a 50 ml round-bottomed flask equipped with a condenser, with magnetic stirring. The round-bottomed flask is immersed in a bath of oil thermostated at 130° C. for 10 minutes. At the end of this reaction, the mixture is in homogeneous and viscous resitol form. It is recovered, placed in an aluminum dish and baked in an oven, under atmospheric pressure, according to a baking program consisting of an increase in temperature from 40° C. to 180° C. at the rate of 3° C./h and of a stationary temperature phase of 24 h at 180° C. The resite material obtained at the end of this baking is black and rigid.

This reaction is summarized by the synthesis scheme below.

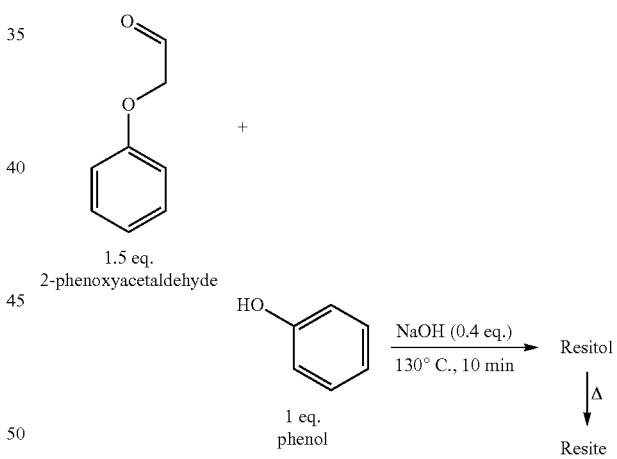

1.5 eq.
2-phenoxyacetaldehyde 1 eq.
phenol

NaOH (0.4 eq.)
130° C., 10 min
→ Resitol
↓ Δ
Resite

Example 5: Grafting of Aliphatic Aldehyde Functions for the Preparation of Phenolic Resins without Formaldehyde In this example, 4-hydroxybenzaldehyde-diethoxyethane was first of all synthesized according to the operating protocol described below.

4-Hydroxybenzaldehyde (4.15 g, 1 eq., 34 mmol), potassium carbonate (9.4 g, 2 eq., 68 mmol), 2-bromo-1,1-diethoxyethane (13.4 g, 2 eq., 68 mmol) and butyronitrile (30 ml) are placed in a 100 ml round-bottomed flask equipped with a condenser, with magnetic stirring. The medium is placed at reflux of the butyronitrile, at 115° C. After 5 days of reaction, the conversion of the 4-hydroxybenzaldehyde to 4-hydroxybenzaldehyde-diethoxyethane, determined by ¹H NMR analyses of the reaction crude, is total. The reaction medium is filtered through filter paper and the product is purified by liquid-liquid extraction with EtOAc/H₂O. The organic phases are recovered, dried over anhydrous magnesium sulfate and concentrated under reduced pressure. The residual acetal reagent present in the product is distilled off under secondary vacuum (T=100° C., P=2×10⁻² mbar). 6.9 g of 4-hydroxybenzaldehyde-diethoxyethane product are obtained. The product characterized by ¹H and ¹³C NMR is pure. Appearance: yellow oil. Weight yield=85%. This reaction is summarized by the synthesis scheme below.

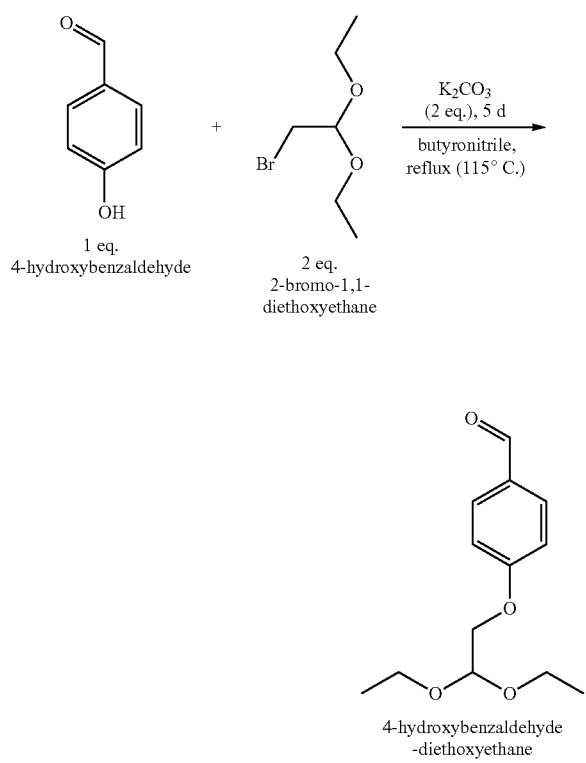

Starting from the 4-hydroxybenzaldehyde-diethoxyethane, 4-hydroxybenzaldehyde-acetaldehyde was then synthesized by carrying out the operating protocol described below.

The 4-hydroxybenzaldehyde-diethoxyethane compound (1 g, 1 eq., 4.2 mmol) and the mixture of solvents consisting of 16 ml of HCl solution at 1 mol/l (3.8 eq., 16 mmol) and of 16 ml of tetrahydrofuran are placed in a 100 ml round-bottomed flask with magnetic stirring and equipped with a condenser. The round-bottomed flask is placed in a bath of oil thermostated at 60° C. for 5 hours. At the end of this reaction, the pH of the reaction medium is neutralized with a saturated NaHCO₃ solution, the THF solvent is evaporated off under reduced pressure and the product is purified by liquid-liquid extraction with EtOAc/H₂O. The organic phases are recovered, dried over anhydrous magnesium sulfate and concentrated under reduced pressure. 0.6 g of 4-hydroxybenzaldehyde-acetaldehyde product is obtained. The product characterized by ¹H and ¹³C NMR is pure. Appearance: white powder. Weight yield=87%.

This reaction is summarized by the synthesis figure below.

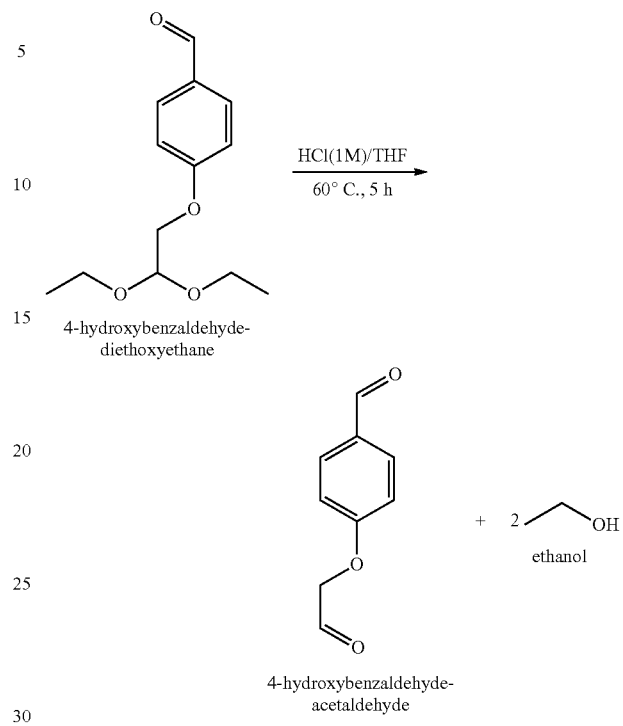

A phenolic resin was then synthesized without formaldehyde from 4-hydroxybenzaldehyde-acetaldehyde according to the operating protocol detailed below.

4-Hydroxybenzaldehyde-acetaldehyde (1.69 g, 0.75 eq., 10.3 mmol), phenol (1.29 g, 1 eq., 131 mmol) and sodium hydroxide in aqueous solution at 50% by weight (0.16 g, 0.3 eq., 4 mmol) are placed in a 50 ml round-bottomed flask equipped with a condenser, with magnetic stirring. The round-bottomed flask is immersed in a bath of oil thermostated at 130° C. for 15 minutes. At the end of this reaction, the mixture is in homogeneous and viscous resitol form. It is recovered, placed in an aluminum dish and baked in an oven, under atmospheric pressure, according to a baking program consisting of an increase in temperature from 40° C. to 180° C. at the rate of 3° C./h and of a stationary temperature phase of 24 h at 180° C. The resite material obtained at the end of this baking is black, rigid and totally insoluble in acetone.

This reaction is summarized by the synthesis figure below.

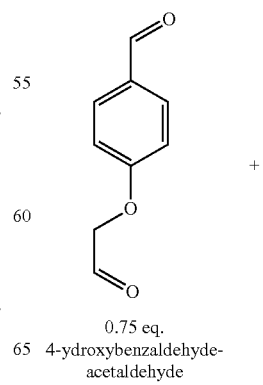

0.75 eq.
4-ydroxybenzaldehyde-acetaldehyde

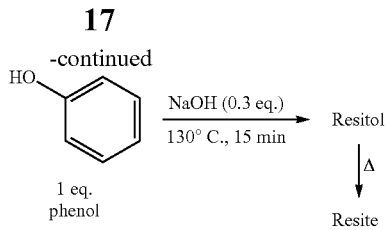

Example 6: Grafting of Aliphatic Aldehyde Functions for the Preparation of Phenolic Resins without Formaldehyde In this example, vanillin-dimethoxyethane was first of all synthesized according to the operating protocol described below.

Vanillin (11.25 g, 1 eq., 74 mmol), potassium carbonate (40.9 g, 4 eq., 296 mmol), 2-bromo-1,1-dimethoxyethane (25 g, 2 eq., 147.9 mmol) and butyronitrile (240 ml) are placed in a 500 ml round-bottomed flask equipped with a condenser, with magnetic stirring. The medium is placed at reflux of the butyronitrile, at 115° C. After four days of reaction, the conversion of the vanillin to vanillin-dimethoxyethane, determined by $^1$H NMR analysis of the reaction crude, is total. The reaction medium is filtered through filter paper and the product is purified by liquid-liquid extraction with EtOAc/H$_2$O. The organic phases are recovered, dried over anhydrous magnesium sulfate and concentrated under reduced pressure. The residual acetal reagent present in the product is distilled off under secondary vacuum (T=100° C., P=2×10$^{-2}$ mbar). 16.74 g of vanillin-dimethoxyethane product are obtained. The product characterized by $^1$H and $^{13}$C NMR is pure. Appearance: yellow oil. Weight yield=94%. This reaction is summarized by the synthesis scheme below.

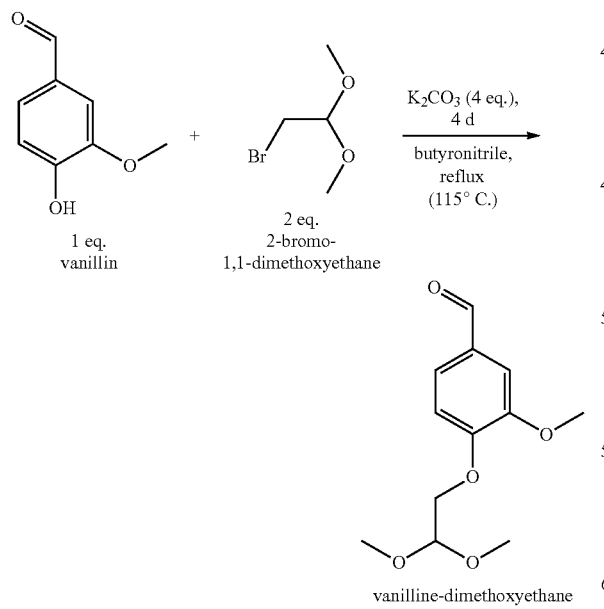

Starting from the vanillin-dimethoxyethane, vanillin-acetaldehyde was then synthesized by carrying out the operating protocol described below.

The vanillin-dimethoxyethane compound (1 g, 1 eq., 4.2 mmol) and the mixture of solvents consisting of 16 ml of HCl solution at 1 mol/l (3.8 eq., 16 mmol) and of 16 ml of tetrahydrofuran are placed in a 100 ml round-bottomed flask with magnetic stirring and equipped with a condenser. The round-bottomed flask is placed in a bath of oil thermostated at 60° C. for 22 hours. At the end of this reaction, the pH of the reaction medium is neutralized with a saturated NaHCO$_3$ solution, the THF solvent is evaporated off under reduced pressure and the product is purified by liquid-liquid extraction with EtOAc/H$_2$O. The organic phases are recovered, dried over anhydrous magnesium sulfate and concentrated under reduced pressure. 0.75 g of vanillin-acetaldehyde product is obtained. The product characterized by $^1$H and $^{13}$C NMR is pure. Appearance: white powder. Weight yield=90%.

This reaction is summarized by the synthesis figure below.

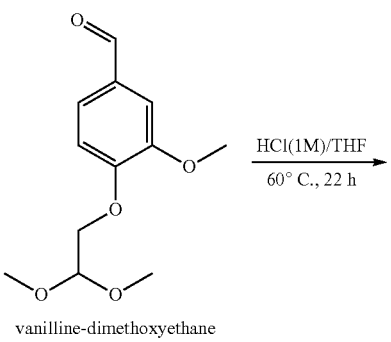

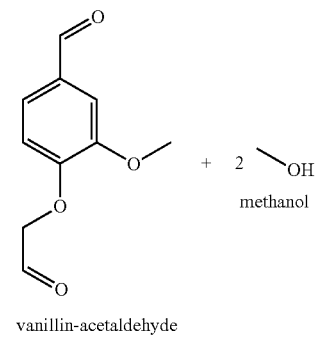

A phenolic resin was then synthesized without formaldehyde from vanillin-acetaldehyde according to the operating protocol detailed below.

Vanillin-acetaldehyde (2 g, 0.75 eq., 10.3 mmol), phenol (1.29 g, 1 eq., 13.7 mmol) and sodium hydroxide in aqueous solution at 50% by weight (0.16 g, 0.3 eq., 4 mmol) are placed in a 50 ml round-bottomed flask equipped with a condenser, with magnetic stirring. The round-bottomed flask is immersed in a bath of oil thermostated at 130° C. for 5 minutes. At the end of this reaction, the mixture is in homogeneous and viscous resitol form. It is recovered, placed in an aluminum dish and baked in an oven, under atmospheric pressure, according to a baking program consisting of an increase in temperature from 40° C. to 180° C. at the rate of 3° C./h and of a stationary temperature phase of 24 h at 180° C. The resite material obtained at the end of this baking is black, rigid and totally insoluble in acetone.

This reaction is summarized by the synthesis figure below.

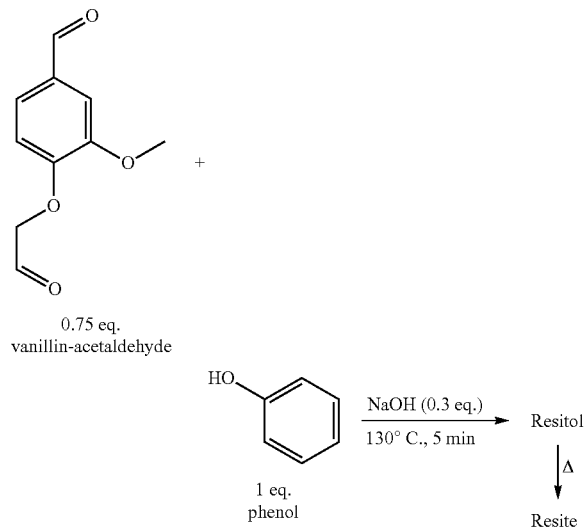

Example 7: Analysis of the Heat Stability and Carbonizing Properties of the Crosslinked Phenolic Resins Obtained The measurements of the coke contents of the synthesized resites were carried out by thermogravimetric analyses (TGA) on a Q50 instrument sold by the company TA Instruments. A 30 mg sample of resite in monolithic form is placed on a platinum cradle and then heated, under a nitrogen stream (60 ml/min) according to the following program:

Linear increase from 20° C. to 160° C. at the rate of 10° C./min.

Stationary temperature phase for one hour at 160° C. (iw).

Linear increase from 160° C. to 900° C. at the rate of 10° C./min.

Stationary temperature phase for one hour at 900° C. (fw).

The coke content is calculated according to the following equation, wherein the parameters iw and fw represent the weights of the sample at the end of the stationary temperature phases at 160° C. and 900° C., respectively:

Coke content=$fw/iw$.

FIG. 1 represents the results obtained by TGA for the resins synthesized in examples 1 (4-phenoxybenzaldehyde/phenol resite), 2 (4-hydroxybenzaldehyde-benzaldehyde/phenol resite) and 3 (vanillin-benzaldehyde/phenol resite) in comparison with the results obtained for Ablaphene RS101.

Figure 2:
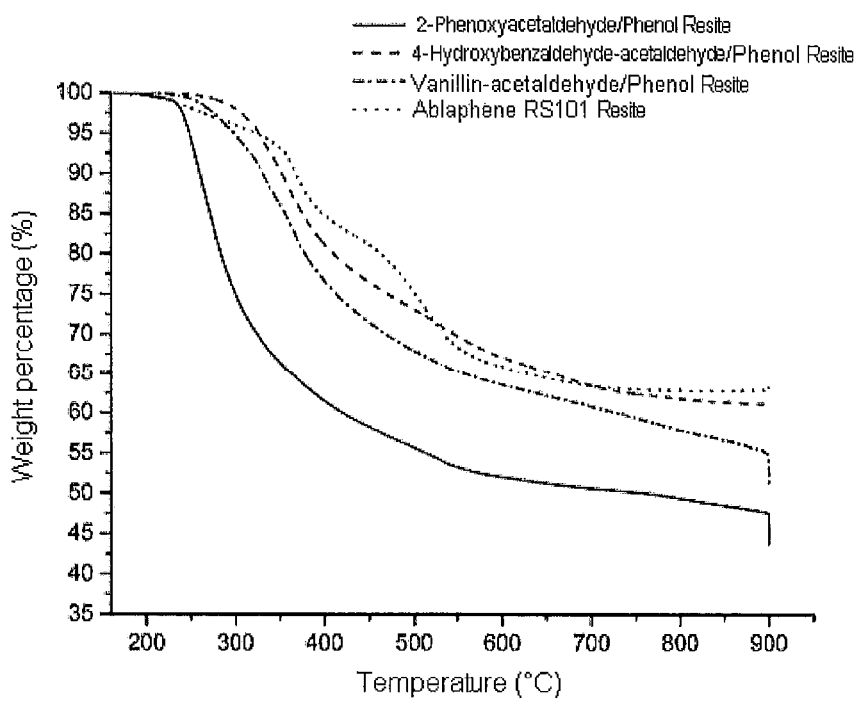

FIG. 2 represents the results obtained by TGA for the resins synthesized in examples 4 (2-phenoxyacetaldehyde/phenol resite), 5 (4-hydroxybenzaldehyde-acetaldehyde/phenol) and 6 (vanillin-acetaldehyde/phenol) in comparison with the results obtained for Ablaphene RS101.

The coke content and also the degradation temperatures at 10% by weight (Td10%) of the resins tested are reported in tables 1 and 2 below.

TABLE 1

| Resite | Td10% | Coke content |
|---|---|---|
| 4-Phenoxybenzaldehyde/Phenol | 375° C. | 56% |
| 4-Hydroxybenzaldehyde-benzaldehyde/phenol | 497° C. | 66% |
| Vanillin-benzaldehyde/Phenol | 440° C. | 68% |
| Ablaphene RS101 | 370° C. | 63% |

TABLE 2

| Resite | Td10% | Coke content |
|---|---|---|
| 2-Phenoxyacetaldehyde/Phenol | 260° C. | 44% |
| 4-Hydroxybenzaldehyde-acetaldehyde/phenol | 352° C. | 61% |
| Vanillin-acetaldehyde/Phenol | 330° C. | 51% |
| Ablaphene RS101 | 370° C. | 63% |

These results show that the resins produced by means of the method according to the invention can have heat stability and carbonizing properties that are similar to, or even better than, those of the Ablaphene RS101 reference resin. This method thus gives access to phenolic resins which can advantageously replace the conventional formo-phenolic resins for the production of aeronautical parts such as propulsion nozzles. In addition, these results show that the use of a polyfunctional aromatic aldehyde compound (4-hydroxybenzaldehyde-acetaldehyde, vanillin-acetaldehyde, 4-hydroxybenzaldehyde-benzaldehyde or vanillin-benzaldehyde) advantageously makes it possible to obtain improved heat stability and carbonizing properties compared with the use of monofunctional aromatic aldehyde compounds (2-phenoxyacetaldehyde and 4-phenoxybenzaldehyde).

The expression "comprising/containing a" should be understood as "comprising/containing at least one".

The expression "between . . . and . . . " or "from . . . to . . . " should be understood as including the limits.

The invention claimed is:

1. A method for producing a propulsion nozzle, wherein the nozzle is produced from a phenolic resin obtained at least by carrying out the following step:

a) pre-polymerization of an aromatic aldehyde compound with a phenolic compound in order to obtain the phenolic resin, the aromatic aldehyde compound having the following formula A:

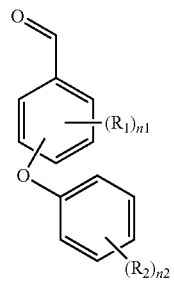

A the aromatic aldehyde compound being polyfunctional and an aromatic polyaldehyde compound, and formula A being such that $n_1$ is an integer between 0 and 4 and when $n_1$ is greater than or equal to 2, the substituents $R_1$ are identical or different, $n_2$ is an integer between 0 and 5 and when $n_2$ is greater than or equal to 2, the substituents $R_2$ are identical or different, and formula A being such that the substituents $R_1$ and $R_2$ are chosen independently from one another from: —OH, —COOH, —CHO, the groups —O-Alk wherein Alk denotes a substituted or unsubstituted alkyl chain of 1 to 4 carbon atoms, saturated or unsaturated, substituted or unsubstituted hydrocarbon-based chains comprising between 1 and 20 carbon atoms, interrupted or not interrupted with one or more heteroatoms, and having or not having one or more carbonyl or carboxylic acid functions, substituted or unsubstituted, monocyclic or polycyclic, saturated, unsaturated or aromatic carbocyclic or heterocyclic groups having or not having one or more carbonyl or carboxylic acid functions, and substituted or unsubstituted aryl groups having or not having one or more carbonyl or carboxylic acid functions, $R_2$ also denoting or not denoting a radical of formula A1 in formula A above and $R_1$ also denoting or not denoting a radical of formula A2 in formula A above, formulae A1 and A2 being the following:

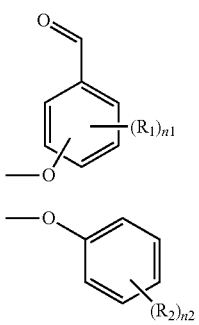

in formulae A1 and A2, $R_1$, $R_2$, $n_1$ and $n_2$ are as defined above.

2. The method as claimed in claim 1, wherein the aromatic aldehyde compound used during step a) has the formula A and wherein the method comprises, in addition, before step a), a step of producing said aromatic aldehyde compound by aromatic nucleophilic substitution reaction between a compound having the formula A3 and a compound having the formula A4 wherein X denotes a leaving group, the formulae A3 and A4 being the following:

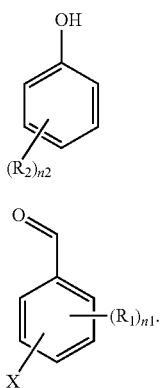

3. The method as claimed in claim 1, wherein the substituents $R_1$ and $R_2$ are chosen independently from one another from: —OH, —CHO, the groups —O-Alk wherein Alk denotes a substituted or unsubstituted alkyl chain of 1 to 4 carbon atoms, —COOH, and substituted or unsubstituted aryl groups having or not having one or more carbonyl or carboxylic acid functions, $R_2$ also denoting or not denoting a radical of formula A1 in formula A and $R_1$ also denoting or not denoting a radical of formula A2 in formula A above; in formulae A1 and A2, $R_1$ and $R_2$ are as defined above in this claim.

4. The method as claimed in claim 3, wherein the substituents $R_1$ and $R_2$ are chosen independently from one another from: —OH, —CHO, —OMe wherein Me denotes a methyl group, and substituted or unsubstituted aryl groups having or not having one or more carbonyl or carboxylic acid functions.

5. The method as claimed in claim 1, wherein $n_1$ is between 0 and 2 and $n_2$ is between 0 and 3 for formula A.

6. The method as claimed in claim 2, wherein the compound of formula A3 used for producing the aromatic aldehyde compound is chosen from: simple phenols, polyphenolic compounds, hydroxybenzoic aldehydes, hydroxybenzoic acids, hydroxybenzyl alcohols, hydroxycinnamyl alcohols, hydroxycinnamic acids, phenylpropenes, coumarins, naphthoquinones, stilbenoids, flavonoids, isoflavonoids, anthocyans, lignans, lignins, condensed tannins, hydrolyzable tannins, depolymerized tannins, and resol and novolac resins.

7. The method as claimed in claim 6, wherein the compound of formula A3 used for producing the aromatic aldehyde compound is chosen from: simple phenols and hydroxybenzoic aldehydes.

8. The method as claimed in claim 6, wherein the compound of formula A3 used for producing the aromatic aldehyde compound is chosen from: phenol, pyrocatechol, resorcinol, hydroquinone, phloroglucinol, pyrogallol, guaiacol, syringol, bis-phenol A, bis-phenol S, para-hydroxybenzaldehyde, vanillin, syringaldehyde, dehydrodivanillin, 2-hydroxybenzyl alcohol, 4-hydroxybenzyl alcohol, vanillyl alcohol, syringyl alcohol, para-coumaryl alcohol, coniferyl alcohol, sinapyl alcohol, ferulic acid, para-hydroxybenzoic acid, gallic acid, para-coumaric acid, eugenol, isoeugenol, cardanols, cardols, anacardic acids, catechin, umbelliferone, juglone, trans-resveratrol, kaempferol, daidzein, delphinidol, enterodiol, lignins, procyanidins, gallotannins, condensed tannins, and resol and novolac resins.

9. The method as claimed in claim 1, wherein the nozzle is produced from a phenolic resin obtained by carrying out the pre-polymerization step or from a crosslinked phenolic resin obtained after carrying out a step wherein a heat treatment is carried out so as to crosslink phenolic resins obtained by carrying out the pre-polymerization step.

* * * * *